United States Patent [19]
Fertl

[11] 3,895,520
[45] July 22, 1975

[54] WELL LOGGING METHOD USING WELL LOGGING TOOLS RUN THROUGH A DRILL STEM TEST STRING FOR DETERMINING IN-SITU CHANGE IN FORMATION WATER SATURATION VALUES

[75] Inventor: Walter H. Fertl, Ponca City, Okla.

[73] Assignee: Continental Oil Company, Ponca City, Okla.

[22] Filed: July 27, 1973

[21] Appl. No.: 383,220

[52] U.S. Cl. .................................................. 73/152
[51] Int. Cl............................................ E21b 49/00
[58] Field of Search ...... 73/152, 151, 155; 250/255, 250/270, 269, 256, 258

[56] References Cited
UNITED STATES PATENTS
3,306,102   2/1967   Lebourg................................ 73/155

*Primary Examiner*—Jerry W. Myracle
*Attorney, Agent, or Firm*—William J. Miller

[57] ABSTRACT

An improved well logging method for determining formation evaluation parameters in a zone of interest wherein a drill stem test string is run in a formation borehole and a logging tool is run through an opening extending through a portion of the drill stem test string during a first and a second logging run, the logging tool having a tool response indicative of the formation water saturation value ($S_W$). A sample portion of the formation fluid in the zone of interest is removed between the first and the second logging runs producing a change in the formation water saturation value, the logging tool response produced during the first logging run being indicative of a first formation water saturation value ($S_{W1}$) and the logging tool response produced during the second logging run being indicative of the second formation water saturation value ($S_{W2}$). In one form, the logging tool responses produced during the first and the second logging runs are each plotted on a comparable scale of a chart such that the separation between the plots of the logging tool responses is indicative of the formation potential productivity in the zone of interest and, in one other form, the differences between the logging tool responses produced during the first and the second logging runs are each plotted on a comparable scale of a chart producing a differential curve plot indicative of the formation potential productivity in the zone of interest.

13 Claims, 5 Drawing Figures

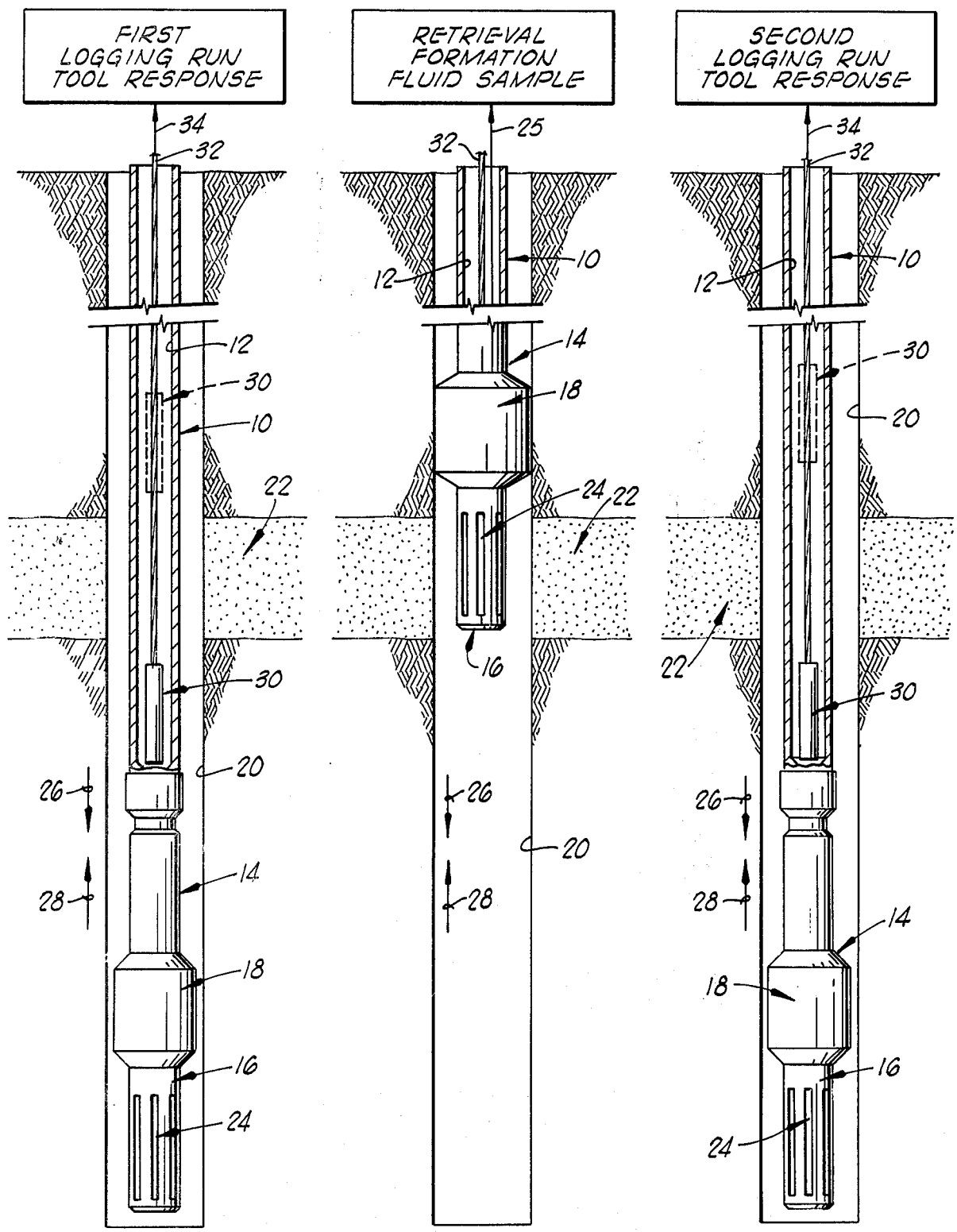

WELL LOGGING METHOD USING WELL LOGGING TOOLS RUN THROUGH A DRILL STEM TEST STRING FOR DETERMINING IN-SITU CHANGE IN FORMATION WATER SATURATION VALUES

BACKGROUND OF THE INVENTION

1. Field of the Invention

The method of the present invention relates generally to a well logging method and, more particularly, but not by way of limitation, to a well logging method wherein logging tools are run through a portion of a drill stem test string producing logging tool responses indicative of an in-situ change in the formation water saturation value produced via removing a sample portion of the formation fluid.

2. Brief Description of the Prior Art

In the past, various reservoir or formation evaluation parameters have been obtained from field-determined data obtained utilizing the tool responses of a number of logging tools such as logging tools of the type commonly referred to as a density log, a sonic log, a resistivity log, an induction log, a gamma ray log, a pulsed neutron or neutron log or the like, for example. The responses obtained from logging runs utilizing logging tools of the type referred to before each essentially provide a plot of the logging tool response as a function of the formation borehole depth. The tool responses of a number of logging runs utilizing the various logging tools are then generally quantatively analyzed to determine various formation evaluation parameters indicative of the productivity of the formation being investigated. Apparatus have also been constructed in the past for removing a sample portion of formation fluid from a predetermined formation zone of interest such apparatus being utilized in procedures commonly referred to in the art as "drill stem tests" and "wire line retrievable coring," for example.

SUMMARY OF THE INVENTION

The present invention contemplates a well logging method wherein logging tools are run through a portion of a drill stem test string and a sample portion of the formation fluid in the zone of interest is removed between a first and a second logging tool run, the removal of the sample portion of formation fluid producing an in-situ change in the formation water saturation values. Each logging tool has a tool response responsive to and indicative of the formation water saturation value and the tool responses of the logging tools utilized during the first and the second logging runs are indicative of the change in the formation water saturation values, the logging tool responses produced via the method of the present invention indicating the formation potential productivity in the formation zone of interest. The first and the second logging run tool responses are each connected to a recorder providing a digital or an analog type of graphic presentation of the received tool responses, the graphic presentation plotting the logging tool responses on a comparable scale of a chart, in one form, and plotting the differences between the logging tool responses, in one other form. The logging tool responses produced utilizing the well logging method of the present invention are also useful in determining additional formation evaluation parameters indicative of the formation potential productivity in one other contemplated aspect of the present invention.

An object of the present invention is to provide an improved well logging method for producing tool responses indicative of an in-situ change in the formation water saturation value in a zone of interest.

Another object of the invention is to provide an improved well logging method wherein formation water saturation values in the formation zone of interest are changed in-situ between a first and a second logging run.

One another object of the invention is to provide an improved well logging method which is more efficient and economical.

A further object of the invention is to provide an improved well logging method producing tool responses indicative of formation evaluation parameters capable of utilization in clean and shaly formation zones of interest.

A still further object of the invention is to provide an improved well logging method displaying formation evaluation parameters in a more convenient and economical manner.

Other objects and advantages of the invention will be evident from the following detailed description when read in conjunction with the accompanying drawings which illustrate preferred embodiments of the invention.

BRIEF DESCRIPTION OF THE DRAWINGS

FIG. 1 is a diagrammatic, schematic view showing a drill stem test string and a logging tool positioned in a formation borehole during one aspect of the operation of the present invention.

FIG. 2 is a diagrammatic, schematic view, similar to FIG. 1, but showing the drill stem test string positioned in the formation borehole for receiving a sample portion of the formation fluid.

FIG. 3 is a diagrammatic, schematic view, similar to FIGS. 1 and 2, but showing the drill stem test string and a logging tool positioned in the formation borehole during one aspect of the operation of the present invention.

DESCRIPTION OF THE PREFERRED EMBODIMENTS

Figure 4:
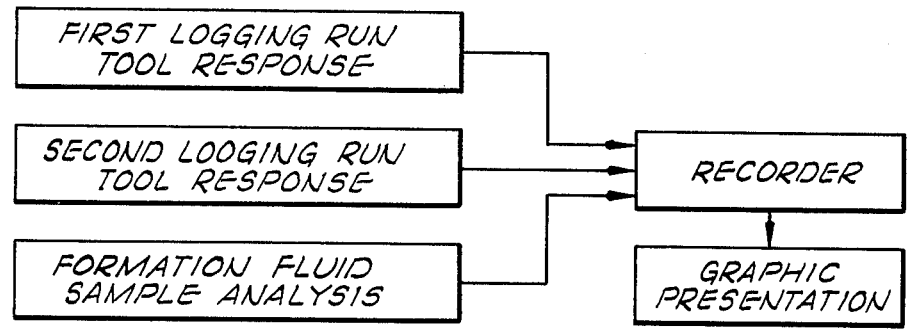
FIG. 4 is a schematic, diagrammatic view showing a display apparatus for receiving and displaying formation parameters produced via the well logging method of the present invention.

In the evaluation of a particular reservoir or formation to determine potential productivity and various commercial indicators of that particular reservoir or formation, numerous parameters relative to the formation are generally determined and those parameters are then manipulated to yield particular interpretative data. For example, in evaluating formations containing hydrocarbons, various parameters such as, for example, porosity, hydrocarbon saturation, water saturation, gas/oil ratio, and permeability are commonly utilized to evaluate the potential productivity of the formation or, in other words, to evaluate the presence of hydrocarbons in the formation and the commercial feasibility of removing the hydrocarbons from the formation being evaluated. It is particularly important in many applications that formation evaluation parameters be produced in such a manner that the formation evaluation parameters are available in a quick and convenient form at the well site to facilitate the various decisions necessarily made during the drilling operations, the well logging method of the present invention providing a fast, convenient and economical method for logging a well borehole and obtaining certain formation evaluation parameters available at the well site in a more convenient and demonstrative form, in a manner which will be described in detail below.

In determining formation evaluation parameters, various "logging" apparatus and associated interpretative techniques have been developed in the art. The terms "logging" and "logging tool response" or "tool response" are well-known in the art, and generally refer to a device and a procedure for obtaining a plot of a particular formation parameter as a function of the formation borehole depth, the particular formation parameter being generally determined via the type of logging apparatus utilized in a particular application. The terms "logging tool runs," "logging," "log runs" and "logging runs" are generally utilized in the art and herein to refer to the logging tool apparatus and the associated method or technique of positioning such apparatus in the formation borehole to obtain the desired plots of the logging tool responses.

Referring more particularly to the method of the present invention, a logging tool, having a tool response indicative of the formation water saturation value ($S_W$), is lowered in the formation borehole to the position generally near the formation zone of interest during a first and a second logging run and a formation fluid sample is obtained via removing a sample portion of the formation fluid generally from the zone of interest, the sample portion being removed generally between the first and the second logging runs. The removal of the sample portion of the formation fluid changes the formation water saturation value from an initial or first formation water saturation value ($S_{W1}$) to a second formation water saturation value ($S_{W2}$) wherein the first formation water saturation value ($S_{W1}$) represents the formation water saturation value in the formation zone of interest prior to the removal of the sample portion of the formation fluid and the second formation water saturation value ($S_{W2}$) represents the formation water saturation value in the formation zone of interest after the removal of the sample portion of the formation fluid. The formation water saturation value in the formation zone of interest is changed or altered in-situ by removing a sample portion of the formation fluid between the first logging run and the second logging run in a manner such that the drill stem test string, including the drill stem test apparatus connected thereto, remains positioned within the formation borehole during the first and the second logging runs and during the sampling of the formation fluid thereby eliminating the necessity of removing the drill stem test string and associated drill stem test apparatus during the running of the logging tools, in a manner which will be described in greater detail below.

Some of the steps of the method of the present invention are diagrammatically and schematically illustrated in FIGS. 1, 2 and 3. In general, the method utilizes a drill stem test string 10 having an opening 12 formed through a portion thereof and extending axially therethrough and a drill stem test apparatus 14 connected to one end of the drill stem test string 10. In one form, the drill stem test apparatus 14 includes an anchor 16 and a packer 18, the drill stem test string 10 being shown in FIGS. 1, 2 and 3 in various positions in a formation borehole 20 having a zone of interest designated via the general reference numeral 22 for the purpose of illustration.

The drill stem test string 10 is connected to the end of the drill stem test apparatus 14 opposite the anchor 16 end thereof. The anchor 14 includes a plurality of perforations, designated via the general reference numeral 24, providing an entrance for receiving formation fluid within a portion of the drill stem test apparatus 14, the opening 12 communicating with a portion of the drill stem test apparatus 14 during one aspect of the operation of the drill stem test string 10 for reasons to be made apparent below.

The packer 18 is positionable in a collapsed position, as shown in FIGS. 1 and 3, and in an activated position as shown in FIG. 2. In the activated position of the packer 18, the packer 18 sealingly engages a portion of the wall formed in the formation via the borehole 20 and a portion of the formation fluid is produced through the perforations 24 formed in the anchor 16 and through a portion of the drill stem test apparatus 14. A sample portion of the formation fluid is retained within a portion of the drill stem test apparatus 14 for subsequent retrieval and analysis, the retrieval of the sample portion of the formation fluid during this aspect of the operation being diagrammatically indicated in FIG. 2 via the arrows 25 and the indication "RETRIEVAL FORMATION FLUID SAMPLE."

The end of the drill stem test string 10, opposite the drill stem test apparatus 14 end, is connected to a power assembly (not shown) which is constructed and connected to the drill stem test string 10 for lowering the drill stem test string 10 in a direction 26 in one position and raising the drill stem test string 10 in a direction 28 in one other position. Power assemblies connectable to a drill stem test string for raising and lowering the drill stem test string in a formation borehole are well-known in the art and a detailed description of the construction and operation of any particular embodiment is not required herein.

The opening 12 through the drill stem test string 10 is of a sufficient size to receive a logging tool 30 allowing the logging tool 30 to be raised and lowered through the opening 12 during the operation of the method of the present invention. The logging tool 30 is connected to one end of a cable 32 (partially shown in FIGS. 1, 2 and 3) and the opposite end of the cable 32 is connected to a cable drive (not shown) such as a winch assembly or the like located at the surface of the earth, the cable drive (not shown) being constructed to raise and lower the logging tool 30 within the opening 12 through the drill stem test string 10 in the general directions 28 and 26, respectively, in a conventional manner well-known in the art.

In one form, as diagrammatically shown in FIGS. 1 and 3, the cable 32 contains insulated conductors connected to the logging tool 30 for transmitting a tool response signal 34 to the earth's surface. During the operation of the method of the present invention, the logging tool 30 is run through the opening 12 of the drill stem test string 10 during a first logging run and during a second logging run, and the tool response signal 34 more particularly provides a first logging run tool response during the first logging run (as diagrammatically shown in FIG. 1 and indicated therein via "FIRST LOGGING RUN TOOL RESPONSE"), and a second logging run tool response during the second logging run (as diagrammatically shown in FIG. 3 and indicated therein via "SECOND LOGGING RUN TOOL RESPONSE").

Drill stem test apparatus, having an opening extending through a portion thereof and a drill stem test apparatus for receiving a sample portion of the formation fluid in what is sometimes referred to herein as a sample position, including the details of the procedure for obtaining the sample portion of the formation fluid utilizing a drill stem test string and connected drill stem test apparatus, in a manner similar to that described above with respect to the drill stem test string 10 and connected drill stem test apparatus 14, are well-known in the art and the apparatus is available from such companies as Johnston Testers, Inc. of Sugar Land Tex., or Halliburton Services of Duncan, Okla., for example, a detailed description of the operation or apparatus of any particular sampling apparatus of the "drill stem testing" type not being required herein.

It should also be noted that, in one other preferred form, the removing and retrieving of a sample portion of the formation fluid is obtained utilizing sampling methods and apparatus of the type commonly referred to in the art as "wire line retrievable coring" wherein the formation core sample containing the sample portion of formation fluid is retrieved through the drill stem test string while the drill stem test string remains positioned in the borehole utilizing an overshot run down the drill stem test string on a wire line, the sample portion of the formation fluid being retrieved through an opening extending through the drill stem test string in a manner well-known in the art. Sampling apparatus and methods of the "wire line retrievable coring" type are commercially available from such companies as Christensen Diamond Products Company of Salt Lake City, Utah, for example, and a detailed description of the construction and operation of such methods and apparatus is not required herein.

The "wire line retrievable coring" method and apparatus and the "drill stem testing" method and apparatus for removing a sample portion of the formation fluid while the drill stem test string remains positioned in place in the formation borehole are also described in a book entitled "Petroleum Engineering Drilling and Well Completions" by Carl Gatlin, published by Prentice-Hall, Inc. of Englewood Cliffs, N.J. in 1960 (Library of Congress Catalog Number 60-6874). Utilizing either the "wire line retrievable coring" method and apparatus or the "drill stem testing" method and apparatus (commonly referred to as a "production test"), the drill stem test string 10 includes the opening 12 formed through a portion thereof and providing fluidic communication therethrough and the drill stem test string 10 and a drill stem test apparatus for receiving a sample portion of the formation fluid in a sample position thereof during this aspect of the operation. The method of the present invention is more particularly described herein with reference to a "drill stem testing" method and apparatus, it being specifically understood that the "wire line retrievable coring" method and apparatus or other similar methods and apparatus for obtaining sample portions of the formation fluid may be utilized in the method of the present invention.

In general, the drill stem test string 10 is initially lowered in the general direction 26 through the formation borehole 20 to a position wherein a portion of the opening 12 is positioned generally near the formation zone of interest 22, thereby positioning the drill stem test string 10 for receiving the logging tool 30 via the opening 12 during the first logging run. The logging tool 30 is positioned within a portion of the drill stem test string opening 12 and lowered through the opening 12 in a direction 26 to an initial or start position a predetermined distance below the formation zone of interest 22, as shown in solid lines in FIG. 1. The logging tool 30 is then raised through the opening 12 in a direction 28 to a stop position (shown in FIG. 1 in dashed-lines) a predetermined distance above the zone of interest 22, the logging tool 30 being raised past the zone of interest 22 during the first logging run providing the first logging run tool response indicative of the first formation water saturation values ($S_{w1}$) as a function of the borehole 20 depth. The "FIRST LOGGING RUN TOOL RESPONSE" indicating the tool response of the logging tool 30 obtained during the first logging run is also diagrammatically shown in FIG. 4, for reasons to be made more apparent below.

After the completion of the first logging run, the drill stem test string 10 is raised in the direction 28 to a position wherein the packer 18 is positioned a predetermined distance generally above the formation zone of interest 22 and the anchor 16 is disposed generally near the formation zone of interest 22, as shown in FIG. 2. In this position, the packer 18 is activated positioning a portion of the packer 18 in sealing engagement with the wall formed via the borehole 20 isolating the formation zone of interest and relieving the formation zone of interest of the mud column pressure. The drill stem test apparatus 14 is positioned in the sample position allowing the formation zone of interest to produce through the perforations 24 in the anchor 16 and through a portion of the drill stem test apparatus 14, the drill stem test apparatus 14 retaining a predetermined sample portion of the formation fluid for subsequent retrieval and analysis.

The obtaining of the sample portion of the formation fluid alters the formation water saturation value in the formation zone of interest in-situ, as mentioned before. The removed, sample portion of the formation fluid is retrieved at the surface of the earth where the sample portion is tested and analyzed to obtain various formation parameters such as the formation fluid pressure in the zone of interest, the formation fluid salinity in the zone of interest and the gas-to-oil ratio in the zone of interest, for example, in a manner well-known in the art. The step of retrieving the sample portion of the formation fluid is indicated in FIG. 2 via the indication "RETRIEVAL FORMATION FLUID SAMPLE," as mentioned before, and the results of the testing and the analysis of the sample portion of the formation fluid retrieved during this step of the present method is diagrammatically indicated in FIG. 4 via the indication "FORMATION FLUID SAMPLE ANALYSIS."

After the completion of the removal and retrieval of the sample portion of the formation fluid, the drill stem test string 10 is again lowered through the formation borehole 20 in a general direction 26 to a position as shown in FIG. 3, substantially corresponding to the position of the drill stem test string 10 shown in FIG. 1 wherein a portion of the opening 12 is disposed near the formation zone of interest 22, the drill stem test apparatus 14 being disposed a distance generally below the formation zone of interest 22. The logging tool 30 is then lowered to an initial or start position (shown in solid lines in FIG. 3) within the opening 12 of the drill stem test string 10 positioning the logging tool 30 a predetermined distance below the formation zone of interest. The logging tool 30 is then raised through the opening 12 in a direction 28 to a stop position (shown in dashed-lines in FIG. 3) a predetermined distance above the zone of interest 22, the logging tool 30 being raised past the zone of interest during the second logging run providing the second logging run tool response indicative of the second formation water saturation value ($S_{W2}$) as a function of the borehole depth. The "SECOND LOGGING RUN TOOL RESPONSE" indicating the tool response of the logging tool 30 obtained during the second logging run is also diagrammatically shown in FIG. 4, for reasons to be made more apparent below.

In a preferred embodiment, the first logging run tool response, the second logging run tool response and predetermined parameters obtained via the formation fluid sample analysis are connected to the input of a recorder, as diagrammatically shown in FIG. 4. The recorder is constructed to produce a graphic presentation in the form of a digital read-out or a plot of traces on a charge indicative of the first and the second logging run tool responses, in one preferred form of graphic presentation, and the difference between the first and the second logging run tool responses, in one other preferred form of graphic presentation, the recorder also providing additional forms of graphic presentation, in other preferred embodiments, which may be useful in some applications. Recorders constructed to receive logging tool responses and parameters determined via formation fluid sample analysis and provide graphic presentations in a digital form and in the form of traces or plots on a chart, including multi-channel types of recorders simultaneously providing more than one track of traces or plots on a chart, are well-known in the art and commercially available.

Figure 5:
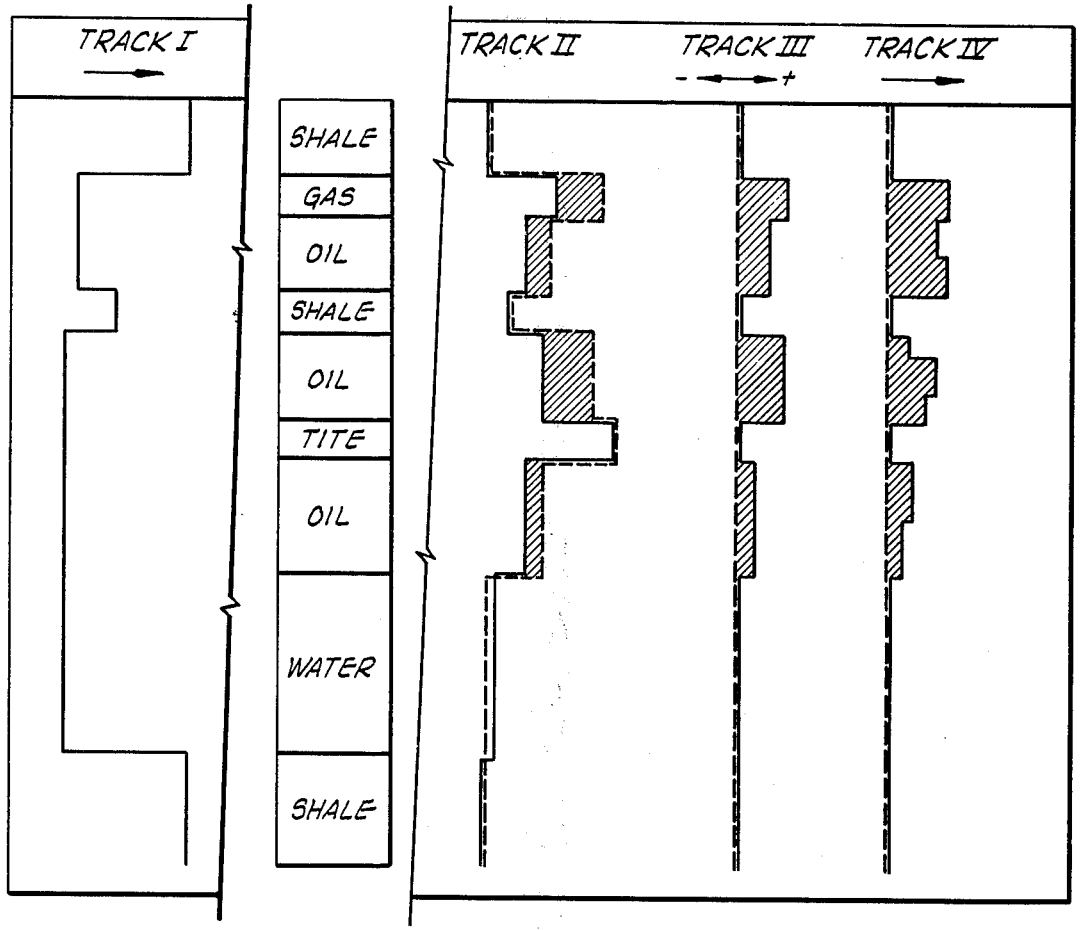
FIG. 5 is a diagrammatic view of one form of graphic presentation produced via the display apparatus of FIG. 4.

Diagrammatically shown in FIG. 5 is one preferred form of graphic presentation having four tracks (the tracks designated in FIG. 5 via the references "TRACK I," "TRACK II," "TRACK III" and "TRACK IV"), the illustration of a formation lithology showing the composition of various zones, i.e., "shale," "gas," "oil," "tite" and "water" being interposed between a fragmented portion of the graphic presentation of FIG. 5 for the purpose of generally illustrating the relationship between the plots of the four tracks and the corresponding formation lithology. The plot shown on TRACK I represents a trace of lithology plot produced via the tool response of a gamma ray logging tool or a neutron logging tool, for example, for the purpose of correlating the plots of TRACKS II, III and IV to open hole logs which may be desirable in some applications. TRACK II shows a plot of the first logging run tool response (shown in solid lines) on a comparable scale and overlayed on a plot of the second logging tool response (shown in dashed-lines), the shaded areas emphasizing the differences between the first and the second logging run tool responses indicative of the formation productivity. The plot of TRACK III shows a trace of the differences between the first and the second logging run tool responses as a function of borehole depth. TRACK IV shows a plot of formation hydrocarbon bulk volume (HBV) as a function of borehole depth. The graphical presentations obtained via the well logging method of the present invention provide a convenient display indicating the formation productivity in a manner such that the display is readily available at the well site to facilitate the making of the various decisions.

As previously described, the logging tool 30 has a tool response responsive to and indicative of the formation water saturation value ($S_W$) and is constructed to provide logging tool responses while being run through the opening 12 in the drill stem test string 10. Various logging tools are commercially available in the art having a tool response indicative of and responsive to the formation water saturation value ($S_W$) as a function of borehole depth, which can be utilized in the well logging method of the present invention, some preferred logging tools being specifically referred to below.

One such logging tool is generally referred to in the art as a "pulsed neutron" type of logging tool, the pulse neutron logging tool having a tool response indicative of and responsive to the time required or the rate at which thermal neutrons generated and emitted at predetermined intervals via the pulsed neutron type of logging tool are captured or absorbed by the formation material. In this last-mentioned type of logging tool, a neutron generator is utilized which is generally of an electro-mechanical source and emits neutrons in controlled, repetitive bursts. The tool response of the pulsed neutron type of logging tool indicates the macroscopic absorption cross section of the formation, referred to generally in the art and herein as the "thermal neutron capture cross section." One such logging tool of the pulsed neutron type, for example, is commercially available under the tradename "THERMAL DECAY TIME LOG" by Schlumberger, Ltd. of New York City, N.Y. One other pulsed neutron type of logging tool, for example, is commercially available under the tradename "NEUTRON LIFETIME LOG" by Dresser Industries, Inc. of Houston, Tex. It should also be noted that the interpretation and applications of logging tools of the pulsed neutron type are discussed in a book entitled "Neutron Lifetime Interpretation" by Dr. D. W. Hilchie, produced and distributed by Dresser Atlas, Division of Dresser Industries, Inc. of Houston, Tex., such logging tools being well-known in the art and a detailed description of the particular apparatus and the field-determined data or tool responses obtained utilizing such logging tools being not required herein.

The change of formation water saturation values $[(S_{W1}) - (S_{W2})]$ is related to the thermal neutron capture cross section of the formation zone of interest as follows:

$$S_{W1} - S_{W2} = \frac{(\Sigma_{R2}) - (\Sigma_{R1})}{\phi[(\Sigma_W) - (\Sigma_{HC})]} \quad (1)$$

wherein:

$S_{W1}$ = the formation water saturation value in the zone of interest during the first logging run;

$S_{W2}$ = the formation water saturation value in the zone of interest during the second logging run;

$\Sigma_{R2}$ = the thermal neutron capture cross section of the formation in the zone of interest determined via the logging tool response of the second logging run;

$\Sigma_{R1}$ = the thermal neutron capture cross section of the formation in the zone of interest determined via the logging tool response of the first logging run;

$\Phi$ = the formation porosity in the zone of interest;

$\Sigma_W$ = the thermal neutron capture cross section of water in the zone of interest in the formation; and $\Sigma_{HC}$ = the thermal neutron capture cross section of the hydrocarbons present in the zone of interest in the formation.

The values of ($\Sigma_{R1}$) and ($\Sigma_{R2}$) utilized in expression (1) above are determined via the logging tool responses of the first and the second logging runs of the method of the present invention. The determination of the values of ($\Phi$), ($\Sigma_W$) and ($\Sigma_{HC}$) are well-known in the art, such determinations being described in the book entitled "Neutron Lifetime Interpretation" referred to above, for example, and determined from data obtained via the formation fluid sample analysis, referred to before. Referring more particularly to the "NEUTRON LIFETIME LOG" of Dresser Industries, Inc., this logging tool provides a tool response directly related to the thermal neutron capture cross section, and the "THERMAL DECAY TIME LOG" of Schlumberger, Ltd. is constructed to provide a tool response responsive to the thermal decay time ($\tau$), the thermal decay time ($\tau$) being related to the thermal neutron capture cross section via the expression:

$$(\Sigma) = (4.55) \div (\tau)$$

The formation movable hydrocarbons (MHC) is related to the difference between the formation water saturation values ($S_{W1}$) and ($S_{W2}$) in the formation zone of interest as follows:

$$MHC = 1.0 - [(S_{W1}) - (S_{W2})] \quad (2)$$

By substituting the algebraic expression (1) above in the algebraic expression (2) above, the formation movable hydrocarbons (MHC) in the formation zone of interest is expressed as follows:

$$MHC = 1.0 - \frac{(\Sigma_{R2}) - (\Sigma_{R1})}{[(\Sigma_W) - (\Sigma_{HC})]} \quad (3)$$

The above expression (3) relates the formation movable hydrocarbons (MHC) in the formation zone of interest to the first and the second logging run tool responses utilizing a logging tool of the type referred to before as a pulsed neutron logging tool or neutron logging tool demonstrating the relationship between the difference between the logging tool responses of the first and the second logging runs and the formation potential productivity utilizing the overlay plot or differential plot referred to before to present the formation potential parameters determined in accordance with the present invention, such as graphic presentation shown on TRACKS II and III of FIG. 5, for example. Further, the formation potential parameters obtained utilizing the well logging method of the present invention are useful for evaluating the formation potential productivity in both clean and shaly pay sands, the determined formation potential parameter indicating the movable hydrocarbons present in the formation zone of interest and the permeability variations in the formation zone of interest.

Utilizing the well logging method of the present invention and a logging tool of the pulsed neutron or neutron type, as described before, the formation hydrocarbon index (HI) in the zone of interest is also determined and plotted, in one form of the invention. Further, the formation hydrocarbon index (HI) in the zone of interest is determined independent of the formation porosity as shown via the expression:

$$HI = \frac{(\Sigma_{R2}) - (\Sigma_{R1})}{(\Sigma_W) - (\Sigma_{HC})} \quad (4)$$

Also, utilizing the method of the present invention and a logging tool of the pulsed neutron or neutron type, described before, a still further formation parameter is determined, in one other aspect of the invention; that is, formation producible hydrocarbon bulk volume (HBV), this parameter being plotted on TRACK IV of FIG. 5. The formation hydrocarbon bulk volume (HBV) is, more particularly, determined utilizing the hydocarbon index (HI) determined via expression (4) above and utilizing the following expression:

$$HBV = 1.0 - (HI) \cdot (\Phi) \quad (5)$$

The well logging method of the present invention is also useful in cooperation with a first and a second logging run utilizing a logging tool of the neutron-gamma ray type which additionally provides an indication of the formation fluid distribution variations in the formation zone of interest prior to and after the sampling test. The neutrongamma ray type of logging tool provides a logging tool response indicative of the formation porosity index ($\Phi_L$), such logging tools being well-known in the art and commercially available from such sources as Schlumberger, Ltd. of New York City, N.Y., for example.

The formation evaluation parameters in the zone of interest are related to the logging tool response of a neutron-gamma ray type of logging tool as follows:

$$\Phi_L = \Phi - \Phi_g \quad (6)$$

wherein:

$\Phi_L$ = the logging tool response of the neutron-gamma ray type of logging tool in the formation zone of interest;

$\Phi$ = the formation porosity, described and determined in a manner referred to before; and $\Phi_g$ = the effect due to the presence of gas in the formation zone of interest.

It should be noted that the neutron-gamma ray type of logging tool response utilized in accordance with the present invention is primarily limited to gas pays since the logging tool response thereof to formation water saturation and oil is approximately the same.

The netutron-gamma ray type of logging tool is utilized to conduct the first and the second logging runs and the logging tool responses obtained during the first and the second logging runs are utilized to provide the overlay type of display and the differential plot type of display in a manner similar to that described before with respect to the pulsed neutron type of logging tool. More particularly, the overlay and the differential plot type of display obtained utilizing the neutron-gamma ray type of logging tool provide a formation evaluation parameter indicating the movable gas in the formation zone of interest, and also provide an indication of stratification present in the formation zone of interest, the term "logging tool having a tool response responsive to or indicative of the formation fluid" being utilized herein to refer to the logging tools described above having tool responses indicative of the formation water saturation values and the logging tools having tool responses indicative of movable gas or, more particularly, the formation porosity index.

The formation gas index (GI) is determined utilizing the logging tool responses of the neutron-gamma ray type of logging tool during the first and the second logging run in accordance with the method of the present invention as follows:

$$GI = (\Phi_{L1}) - (\Phi_{L2}) \qquad (7)$$

wherein:
GI = the formation gas index in the formation zone of interest;
$\Phi_{L1}$ = the logging tool response of the neutron-gamma ray type of logging tool during the first logging run in the formation zone of interest; and
$\Phi_{L2}$ = the logging tool response of the neutron-gamma ray type of logging tool during the second logging run in the formation zone of interest.

It should be particularly noted that the formation evaluation parameters determined utilizing the method of the present invention and the logging tool responses obtained via a neutron-gamma ray type of logging tool provide indications of the formation productivity in the zone of interest in both clean and shaly sands.

Changes may be made in the various steps of the method of the present invention without departing from the spirit and scope of the invention as defined by the following claims.

What is claimed is:

1. A well logging method comprising: positioning s drill stem test string or the like in a borehole near the formation zone of interest; positioning a logging tool through a portion of the drill stem test string or the like generally near the formation zone of interest during a first logging run;
   obtaining a first log from said logging tool having a first logging run tool response responsive to the formation fluid generally within the zone of interest;
   removing a sample portion of the formation fluid generally from the formation zone of interest, thereby producing an in-situ change in the formation fluid in the zone of interest;
   retrieving the sample portion of the formation fluid obtained from the formation zone of interest; and
   obtaining a second log from said logging tool through a portion of the drill stem test string or the like generally near the formation zone of interest during a second logging run, the logging tool having a second logging run tool response responsive to the formation fluid generally within the zone of interest, whereby the first and the second logging run tool responses indicating the formation potential productivity generally within the formation zone of interest.

2. The method of claim 1 defined further to include: receiving the first and the second logging run tool responses; and
   plotting the first and the second logging run tool responses on a comparable scale of a chart, the separation between the plots of the first and the second logging run tool responses indicating the formation potential productivity in the zone of interest.

3. The method of claim 1 defined further to include: receiving the first and the second logging run tool responses; and
   plotting the differences between the first and the second logging run tool responses, the plot of the differences indicating the formation potential productivity in the zone of interest.

4. The method of claim 1 wherein the drill stem test string or the like includes an opening extending through a portion thereof, and wherein the step of positioning the drill stem test string or the like includes positioning the drill stem test string or the like to a location in the formation borehole disposing a portion of the opening through the drill stem test string or the like near the zone of interest; and wherein the steps of running the logging tool during the first and the second logging runs are each defined further as lowering the logging tool through the opening in the drill stem test string or the like.

5. The method of claim 4 wherein the drill stem test string or the like includes a drill stem test apparatus positionable in a sample position for receiving the sample portion of the formation fluid, and wherein the step of positioning the drill stem test string for receiving the sample portion of formation fluid is defined further to include the step of:
   positioning the drill stem test string or the like in the formation borehole disposing the drill stem test apparatus near the zone of interest prior to the positioning of the drill stem test string or the like in the sample position; and
   positioning the drill stem test string or the like in the formation borehole disposing a portion of the opening through the drill stem test string or the like near the zone of interest prior to the running of the second logging run.

6. The method of claim 1 wherein the drill stem test string or the like includes a drill stem test apparatus positionable in a sample position for receiving the sample portion of the formation fluid, and wherein the step of positioning the drill stem test string for receiving the sample portion of formation fluid is defined further to include the step of:
   positioning the drill stem test string or the like in the formation borehole disposing the drill stem test apparatus near the zone of interest prior to the positioning of the drill stem test string or the like in the sample position.

7. The method of claim 1 wherein the steps of running the first and the second logging runs are each defined further to include running a logging tool having a tool response indicative of the formation water saturation value providing first and second logging run tool responses ($S_{w1}$) and ($S_{w2}$), indicative of the formation potential productivity generally within the formation zone of interest.

8. The method of claim 1 wherein the steps of running the first and the second logging runs are each defined further to include running a logging tool having a tool response indicative of the formation porosity index ($\Phi_L$) or the like, the first and the second logging run tool responses indicating the movable gas within the formation zone of interest.

9. The method of claim 8 defined further to include the steps of:

determining the formation gas index (GI) in the zone of interest in the formation borehole via the following expression:

GI = $\Phi_{L1} - \Phi_{L2}$ and plotting the differences between the first and the second logging run tool responses, the plot indicating the formation gas index (GI).

10. The method of claim 1 wherein the steps of running the first logging runs are each defined further to include a pulsed neutron logging tool having a tool response responsive to the thermal neutron capture cross section of the formation fluid generally within the zone of interst, the first and the second logging run responses ($\Sigma_{R1}$) and ($\Sigma_{R2}$) indicating the formation productivity generally within the formation zone of interest.

11. The method of claim 10 defined further to include the steps of:

analyzing the retrieved formation fluid sample, including:

determining the thermal neutron capture cross section of the water ($\Sigma_W$) in the zone of interest in the formation borehole;

determining the thermal neutron capture cross section of the hydrocarbons ($\Sigma_{HC}$) present in the zone of interest in the formation borehole; and determining the formation porosity ($\Phi$) in the zone of interest in the formation borehole; and determining the formation movable hydrocarbons (MHC) via the expression:

$$MHC = 1.0 - \frac{(\Sigma_{R2}) - (\Sigma_{R1})}{[(\Sigma_W) - (\Sigma_{HC})]}.$$

12. The method of claim 10 defined further to include the steps of:

analyzing the retrieved formation fluid sample, including:

determining the thermal neutron capture cross section of the water ($\Sigma_W$) in the zone of interest in the formation borehole; and determining the thermal neutron capture cross section of the hydrocarbons ($\Sigma_{HC}$) present in the zone of interest in the formation borehole; and determining the formation hydrocarbon index (HI) via the expression:

$$HI = \frac{(\Sigma_{R2}) - (\Sigma_{R1})}{(\Sigma_W) - (\Sigma_{HC})}.$$

13. The method of claim 10 defined further to include the steps of:

analyzing the retrieved formation fluid sample, including:

determining the thermal neutron capture cross section of the water ($\Sigma_W$) in the zone of interest in the formation borehole; and determining the thermal neutron capture cross section of the hydrocarbons ($\Sigma_{HC}$) present in the zone of interest in the formation borehole;

determining the formation hydrocarbon bulk volume (HBV) via the following expression:

$$HBV = 1.0 - \frac{(\Sigma_{R2}) - (\Sigma_{R1})}{(\Sigma_W) - (\Sigma_{HC})} \cdot (\phi);$$

and plotting the formation hydrocarbon bulk volume (HBV) on chart type graphic presentation.

* * * * *